United States Patent Office 3,405,119
Patented Oct. 8, 1968

3,405,119
MONO-AZO PIGMENTS
Emil Stocker, Riehen, and Kurt E. Burdeska and Walter Stammbach, Basel, Switzerland, assignors to J. R. Geigy A.G., Basel, Switzerland
No Drawing. Continuation-in-part of application Ser. No. 207,773, July 5, 1962. This application May 10, 1965, Ser. No. 454,630
Claims priority, application Switzerland, July 6, 1961, 7,927/61
4 Claims. (Cl. 260—203)

ABSTRACT OF THE DISCLOSURE

Azo pigments are provided herein corresponding to the formula:

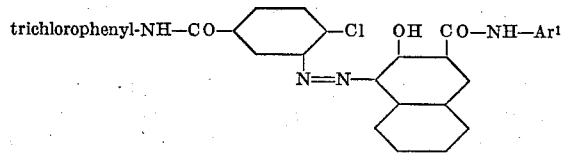

wherein "trichlorophenyl" is a member selected from the groupings

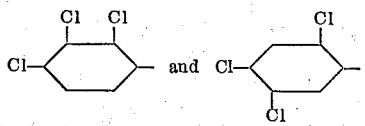

and $Ar^1$ is a member selected from the group consisting of the following radicals

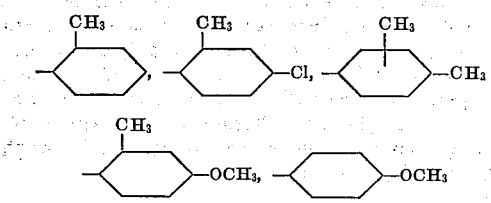

naphthyl - (1) and naphthyl - (2).

---

This is a continuation-in-part application of our copending application Ser. No. 207,773, filed July 5, 1962, and now abandoned.

The present invention concerns new azo pigments.

In particular, it relates to azo pigments which are fast to solvents, cross-lacquering, migration, light and heat. It has now been found that such azo pigments are obtained if a diazotized amine containing 4 or 5 aromatically bound chlorine atoms of the general formula

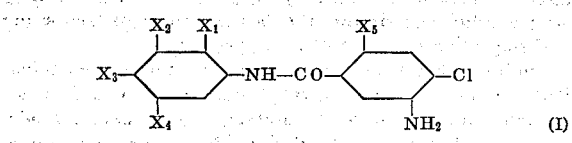

is coupled with a 2 - hydroxynaphthalene - 3 - carboxylic acid arylamide to form a compound of the general formula

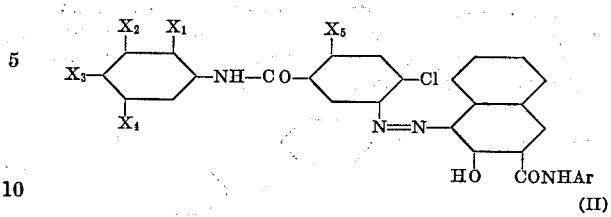

In the Formulas I and II, $X_1$, $X_2$, $X_3$, $X_4$ and $X_5$ represent, independently of each other, hydrogen or chlorine; in Formula II, Ar represents a radical of the benzene or naphthalene series which may be substituted.

A preferred class of azo pigments are compounds of the formula

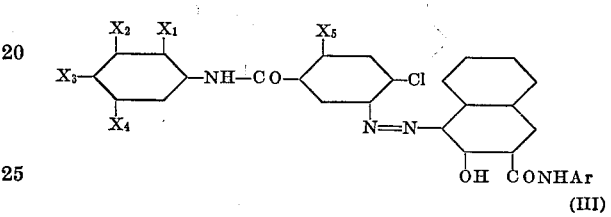

wherein $X_1$, $X_2$, $X_3$, $X_4$ and $X_5$ represent independently hydrogen or chlorine and of which at least one and at most two being hydrogen and Ar represents an unsubstituted naphthyl, an unsubstituted phenyl or a phenyl radical substituted by lower alkyl, lower alkoxy or chlorine.

By the term "lower" as used herein, it is meant radicals with at most 3 carbon atoms.

The amines used according to the invention as diazo components are obtained by reacting, by known methods, 3 - nitro - 4 - chlorobenzoyl chloride or 3 - nitro - 4,6-dichlorobenzoyl chloride, with the corresponding chloroanilines and then reducing the nitro group to the amino group.

The following diazo components produce particularly valuble azo pigments according to the invention:

4-chloro-3-aminobenzoic acid-2′,3′,4′-trichloroanilide,
4-chloro-3-aminobenzoic acid-2′,4′,5′-trichloroanilide,
4-chloro-3-aminobenzoic acid-3′,4′,5′-trichloroanilide,
4,6-dichloro-3-aminobenzoic acid-2′,4′-dichloroanilide,
4,6-dichloro-3-aminobenzoic acid-2′,5′-dichloroanilide,
4,6-dichloro-3-aminobenzoic acid-2′,3′,4′-trichloroanilide, and
4,6-dichloro-3-aminobenzoic acid-2′,4′,5′-trichloroanilide.

Some of the acid amides used as coupling components according to the invention obtained from 2 - hydroxynaphthalene - 3 - carboxylic acid and an aromatic amine have already been described in the literature; they are produced in the known manner, for example, by reacting 2 - hydroxynaphthalene - 3 - carboxylic acid with the desired aromatic amine in the presence of phosphorus trichloride as condensing agent.

Generally the coupling is performed in aqueous, advantageously, acid solution, possibly in the presence of water-miscible, inert, organic solvents, sometimes in the presence of low alcohols such as methanol or ethanol, or in the presence of low ketones such as acetone.

The new azo pigments precipitate out from the reaction mixture immediately after the coupling. They can be isolated in the usual way. They can be used as crude products for many purposes but, if desired, they can be purified by an after-treatment. Thus, for example, the shade, the color-strength and covering power and the fastness to solvents, migration, cross-lacquering, heat and light of the crude pigments can be improved by heating in inert organic solvents, e.g. in optionally halogenated and/or nitrated aromatic hydrocarbons or in certain organic nitrogen bases such as dimethyl aniline or pyridine.

Among the pigments according to the invention, particularly those which fall under the formula

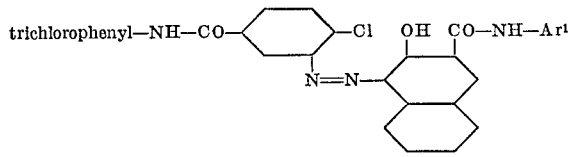

(IV)

wherein "trichlorophenyl" represents the groupings

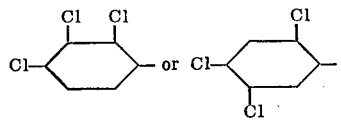

and $Ar^1$ represents one of the following radicals:

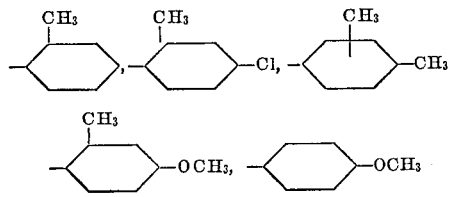

naphthyl-(1) or naphthyl-(2), show especially in lacquers an unexpected improvement when conditioned with solvents which are well known to yield conditioned pigments of good fastness properties. Solvents tested were chlorobenzenes, especially o-dichlorobenzene, nitrobenzene, dimethylaniline and chloronaphthalene. While the structurally closest known pigments conditioned with any of the above solvents show a marked decrease in color strength in stoving lacquers, the pigments according to the invention are practically free from loss in color strength.

The drawback of the known pigments becomes noticeable particularly strongly when these pigments are used reduced with white pigment in automotive enamels. Moreover, if necessary a softer texture of the pigments can be obtained by milling. They are milled either alone or in the presence of milling additives, e.g. in the presence of inorganic or organic salts which can later be removed with solvents and, optionally, in the presence of additional milling additives such as organic solvents.

For this purpose, organic agents which are solid or liquid at room temperature can be used. For example the pigment dyestuffs isolated from the reaction mixture and dried are milled with dehydrated calcium chloride or with sodium sulphate or sodium chloride in the presence of aliphatic or aromatic, optionally chlorinated, and/or nitrated hydrocarbons such as cyclohexane, benzene, toluene, naphthalene, mono-, di- or tri-chlorobenzene, tetrachloroethane or nitrobenzene, low aliphatic ketones such as, e.g. acetone, or low aliphatic monoalcohols, e.g. methanol, ethanol or methoxy- or ethoxy-ethanol. In some cases the pigments can also be refined by milling with organic solvents alone without the addition of salts. After milling, the additives are removed; for example inorganic salts are, e.g. dissolved with water and organic additives are optionally removed by extraction, by distillation or with steam.

The azo pigments according to the invention are suitable for various purposes: for example in printing inks for graphic purposes, in paints having an oily basis such as linseed oil paints, or those having an aqueous basis such as dispersion paints; in lacquers of various types such as, e.g. nitro or stoving lacquers. In addition they can be used for the coloring of viscose or cellulose acetate in the spinning mass, for the pigmenting of synthetic materials, such as polyethylene, polystyrene, polyvinyl chloride, the latter of which can also contain plasticisers, of cellulose esters, of thermosetting resins, or for the pigmenting of rubber, paper pulp or laminates, for the coating of textiles and of synthetic leather, for pigment printing or for pad dyeing of textiles.

The pigments according to the invention are particularly distinguished by a very good fastness to cross-lacquering, light and migration, resistance to solvents and pure shades.

Further details can be seen from the following examples. Where not otherwise expressly stated, parts are given as parts by weight. The temperatures are in degrees centigrade. The relationship of parts by weight to parts by volume is as that of grams to cubic centimeters.

EXAMPLE 1

3.5 parts of 4-chloro-3-aminobenzoic acid-2',3',4'-trichloroanilide (M.P. 205–206°) in 100 parts of concentrated sulphuric acid are stirred at 18° with 5.1 parts by volume of sulphuric acid/nitrosyl sulphuric acid mixture, corresponding to 1.27 parts of $HSO_4NO$, for 1 hour. This mixture is then poured into 1000 parts of ice water and clarified by filtration. A solution of 2.75 parts of 2-hydroxynaphthalene-3-carboxylic acid anilide, in 120 parts of water and 12.5 parts by volume of 2 N sodium hydroxide solution is then added dropwise to the filtrate while stirring vigorously whereupon a red precipitate is formed. The mixture is heated to 50° until no more diazo compound can be traced. The red azo dyestuff which has precipitated is filtered, washed and dried at 60°. A red pigment is obtained which is distinguished by its beautiful shade, good fastness to cross-lacquering in stoving lacquers, good migration fastness in polyvinyl chloride and its very good fastness to light. If desired, its colouristic properties can be still further refined by heating in toluene or dimethylaniline, filtering, washing with alcohol and drying. This red pigment can also be used for graphic or textile printing colours.

EXAMPLE 2

A diazo solution is produced according to Example 1 and, while stirring well, the solution of 3.24 parts of 2-hydroxynaphthalene-3-carboxylic acid-2'-methyl-4'-chloroanilide in 120 parts of water and 25 parts by volume of 2 N sodium hydroxide solution is added dropwise. The coupling is completed by heating to 50° and the dyestuff is filtered off, washed, and dried at 60°. A red pigment is obtained which is similar to that of Example 1. It has very good fastness to solvents, cross-lacquering, migration, heat and light.

On heating the pigment, for example, in nitrobenzene, dichlorobenzene or dimethyl aniline, filtering, washing with alcohol and drying, the fastness to cross-lacquering and migration can be further improved.

Similar valuable pigments are obtained on using equivalent amounts of 2-hydroxynaphthalene-3-carboxylic-acid-2'-methylanilide, -4'-methylanilide, 3',4'-dimethylanilide, -2',4'-dimethylanilide, -4'-ethylanilide, -2'-methoxyanilide, -4'-methoxyanilide, -2' - methoxy - 5' - chloroanilide, -2'- methyl - 4' - methoxyanilide, -2' - ethoxyanilide, -2',4'-dimethoxy-5'-chloroanilide, -2',5'-dimethoxy-4'-chloroanilide, -2',4'-dichloroanilide, -1'-naphthylamide or -2'-naphthylamide as coupling components in otherwise analogous procedure, using 50 parts by volume of 2 N sodium hydroxide solution and 0.5 part of Turkey-red oil.

EXAMPLE 3

3.5 parts of 4-chloro-3-aminobenzoic acid-2',4',5'-trichloroanilide (M.P. 190°) in 50 parts of concentrated sulfuric acid are stirred for 1 hour at 18° with 5.1 parts by volume of sulfuric acid/nitrosyl sulfuric acid mixture corresponding to 1.27 parts of $HSO_4NO$, whereupon this solution is poured into 1000 parts of ice water.

A solution, 60° warm, of 2.7 parts of 2-hydroxynaphthalene-3-carboxylic acid anilide in 180 parts of water and 25 parts by volume of 2 N sodium hydroxide solution is added dropwise within 10 minutes while stirring well to this diazo mixture and the whole is heated to 50°. On completion of the coupling, the reaction mixture is worked up as described in Example 1 whereupon a red pigment having good fastness to cross-lacquering, migration and light is obtained. This pigment also can be refined by heating in organic solvents.

Valuable pigments are obtained if, instead of 2-hydroxynaphthalene-3-carboxylic acid anilide, equimolecular amounts of 2-hydroxynaphthalene-3-carboxylic acid-2'-methylanilide, -4'-methylanilide, -2',4'-dimethylanilide, -3',4'-dimethylanilide, -2' - methyl - 4' - chloroanilide, -2'-methoxyanilide, -4'-methoxyanilide, -2'-methoxy-5'-chloroanilide, -2'-methyl-4'-methoxyanilide, -2'-ethoxyanilide, -1'-naphthylamide or -2'-naphthylamide are used as coupling components, using 50 parts by volume of 2 N sodium hydroxide solution and 0.5 part of Turkey-red oil.

EXAMPLE 4

3.5 parts of 4,6-dichloro-3-aminobenzoic acid-2',5'-dichloroanilide (M.P. 206°) in 50 parts of concentrated sulphuric acid are stirred at 18° with 5.1 parts by volume of a mixture of sulphuric acid and nitrosyl sulphuric acid containing 1.27 parts of $HSO_4NO$. This mixture is then poured into 500 parts of ice water and a 60° warm solution of 2.75 parts of 2-hydroxynaphthalene-3-carboxylic acid anilide in 120 parts of water and 12.5 parts by volume of 2 N sodium hydroxide solution is added dropwise whereupon the whole is heated to 50–55°. On completion of the coupling, the reaction mixture is worked up as described in Example 1. In this way a beautiful red pigment having good fastness to cross lacquering, migration and light is obtained.

A similar, good product is obtained by coupling 3.5 parts of 4,6-dichloro-3-aminobenzoic acid-2',4'-dichloroanilide (M.P. 208–210°) with 3.24 parts of 2-hydroxynaphthalene-3-carboxylic acid-2'-methyl-4' - chloroanilide using 25 parts by volume of sodium hydroxide solution.

EXAMPLE 5

3.845 parts of 4,6-dichloro-3-aminobenzoic acid-2',3',4'-trichloroanilide (M.P. 239–240°) in 50 parts of concentrated sulphuric acid are diazotised at 18° while stirring with 5.1 parts by volume of a mixture of sulphuric acid and nitrosyl sulphuric acid, containing 1.27 parts of $HSO_4NO$. This reaction mixture is poured into 500 parts of ice water and 200 parts by volume of dimethyl formamide are added whereupon the diazo compound is dissolved. This solution is then clarified by filtration, a 60° warm solution of 3.24 parts of 2-hydroxynaphthalene-3-carboxylic acid-2'-methyl-4'-chloroanilide in 120 parts of water and 25 parts of 2 N sodium hydroxide solution is added dropwise to the filtrate and the whole is stirred at 50°. On completion of the coupling, the reaction mixture is worked up as described in Example 1. A red pigment is so obtained which has very good fastness to cross-lacquering and light.

EXAMPLE 6

3.845 parts of 4,6-dichloro-3-aminobenzoic acid-2',4',5'-trichloroanilide (M.P. 256–258°) in 50 parts of concentrated sulphuric acid are stirred for 1 hour at 18° with 5.1 parts by volume of a mixture of sulphuric acid and nitrosyl sulphuric acid, containing 1.27 parts of $HSO_4NO$. The mixture is then poured into 2000 parts of ice water, the temperature is raised to 15° and a 60° warm solution of 3.24 parts of 2-hydroxynaphthalene-3-carboxylic acid-2'-methyl-4'-chloroanilide in 120 parts of water and 25 parts by volume of 2 N sodium hydroxide solution is added dropwise while stirring well. The mixture is heated to 50–55° until coupling is complete, it is then filtered and worked up as described in Example 1. In this way a red pigment is obtained which has very good fastness to cross-lacquering, heat and light.

EXAMPLE 7

A stoving lacquer made from:

20 parts of titanium dioxide (Rutil),
40 parts of a 60% solution of a coconut alkyd resin in xylene (oil content of the resin 32%),
24 parts of a 50% solution of a melamine resin in butanol,
8 parts of xylene,
7.8 parts of ethylene glycol monomethyl ether, and
0.2 part of the pigment from 4-chloro-3-aminobenzoic acid-2',3',4'-trichloroanilide and 2-hydroxynaphthalene-3-carboxylic acid - 2'-methyl-4'-methoxyanilide conditioned with dichlorobenzene as described in Example 2, is finely milled in a ball mill, sprayed onto an aluminum sheet and finally stoved for 30 minutes at 120° C. The dyeing has very good fastness to heat and cross-lacquering and, in spite of the high dilution of the pigment, has excellent fastness to light.

EXAMPLE 8

A mixture consisting of:

67 parts of polyvinyl chloride,
33 parts of dioctyl phthalate,
2 parts of dibutyl tin dilaurate,
0.3 part of a sodium barium salt of an acid phosphoric acid alkyl ester, sold under the name of Ferroclere 541A by Pure Chemicals Limited, Liverpool, England, as light stabiliser,
2 parts of titanium dioxide, and
0.65 part of the pigment obtained from 4 - chloro-3-aminobenzoic acid - 2',4',5' - trichloroanilide and 2-hydroxy-naphthalene - 3 - carboxylic acid - 2' - naphthylamide, which pigment has been heated in dimethyl aniline, filtered, washed with methanol and dried, is worked up on a set of mixing rollers at 160° C. and then drawn out into a film of 0.4 mm. thickness. The dyeing has good fastness to migration, light and heat.

We claim:
1. The compound of the formula

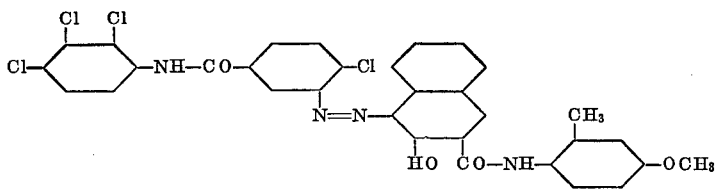

2. The compound of the formula
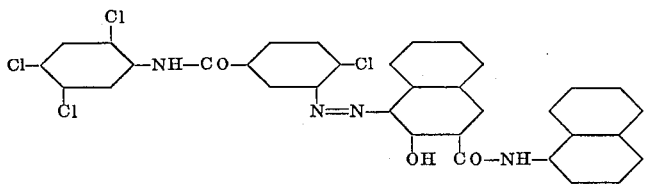
3. The compound of the formula
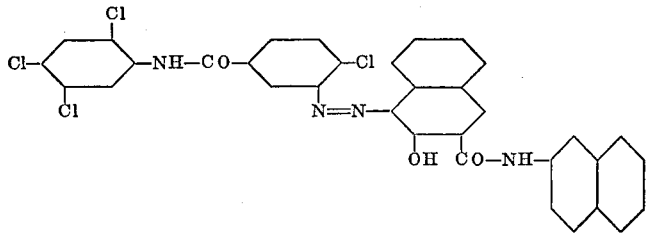
4. The compound of the formula
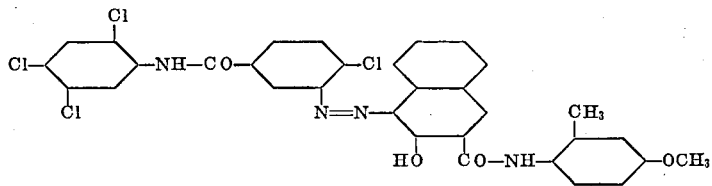
References Cited
UNITED STATES PATENTS
2,703,319  3/1955  Fischer _____ 260—203
FOREIGN PATENTS
889,739  9/1953  Germany.
CHARLES B. PARKER, *Primary Examiner.*
D. M. PAPUGA, *Assistant Examiner.*